United States Patent
Jones, Jr. et al.

(10) Patent No.: US 6,179,939 B1
(45) Date of Patent: Jan. 30, 2001

(54) METHODS OF MAKING STRETCHED FILLED MICROPOROUS FILMS

(75) Inventors: Billy Ray Jones, Jr., Cumming; Rob Lee Jacobs; Tracy Neal Wilson, both of Woodstock, all of GA (US)

(73) Assignee: Kimberly-Clark Worldwide, Inc., Neenah, WI (US)

( * ) Notice: Under 35 U.S.C. 154(b), the term of this patent shall be extended for 0 days.

(21) Appl. No.: 08/854,460

(22) Filed: May 12, 1997

(51) Int. Cl.⁷ .................. B29C 55/06; B29C 65/08; B29C 67/20
(52) U.S. Cl. .......... 156/73.1; 156/164; 156/290; 264/154; 264/288.8
(58) Field of Search .............. 264/154, 288.8; 156/73.1, 164, 290

(56) References Cited

U.S. PATENT DOCUMENTS

| | | | |
|---|---|---|---|
| 3,338,992 | 8/1967 | Kinney | 264/24 |
| 3,341,394 | 9/1967 | Kinney | 161/72 |
| 3,502,763 | 3/1970 | Hartmann | 264/210 |
| 3,542,615 | 11/1970 | Dobo et al. | 156/181 |
| 3,692,618 | 9/1972 | Dorschner et al. | 161/72 |
| 3,734,994 | 5/1973 | Blecha | 264/288 |
| 3,802,817 | 4/1974 | Matsuki et al. | 425/66 |
| 3,843,761 | 10/1974 | Bierenbaum et al. | 264/210 R |
| 3,849,241 | 11/1974 | Butin et al. | 161/169 |
| 3,855,046 | 12/1974 | Hansen et al. | 161/150 |
| 4,041,203 | 8/1977 | Brock et al. | 428/157 |
| 4,190,624 | 2/1980 | Alard et al. | 264/146 |
| 4,255,376 | 3/1981 | Soehngen | 264/145 |
| 4,257,997 | 3/1981 | Soehngen et al. | 264/145 |
| 4,290,987 | 9/1981 | Soehngen et al. | 264/41 |
| 4,340,563 | 7/1982 | Appel et al. | 264/518 |
| 4,370,291 | 1/1983 | Kazama et al. | 264/210.7 |
| 4,374,888 | 2/1983 | Bornslaeger | 428/198 |
| 4,494,629 | 1/1985 | Raeburn | 188/65.5 |
| 4,504,432 | 3/1985 | Kamei et al. | 264/177 F |
| 4,522,203 | 6/1985 | Mays | 128/132 D |
| 4,683,093 | 7/1987 | Hagiwara et al. | 264/22 |
| 4,734,324 | 3/1988 | Hill | 428/317.3 |
| 4,767,578 | 8/1988 | Thimon | 264/40.1 |
| 4,777,073 * | 10/1988 | Sheth . | |
| 4,789,699 | 12/1988 | Kieffer et al. | 524/271 |
| 4,835,245 | 5/1989 | Takasa et al. | 528/230 |
| 4,877,679 | 10/1989 | Leatherman et al. | 428/224 |
| 5,011,698 | 4/1991 | Antoon . | |
| 5,073,316 | 12/1991 | Bizen et al. | 264/22 |
| 5,139,727 | 8/1992 | Utsumi et al. | 264/210.7 |
| 5,143,679 | 9/1992 | Weber et al. | 264/288.8 |
| 5,145,727 | 9/1992 | Potts et al. | 428/198 |
| 5,169,706 | 12/1992 | Collier, IV et al. | 428/152 |
| 5,173,235 | 12/1992 | Kamei et al. | 264/154 |
| 5,178,931 | 1/1993 | Perkins et al. | 428/198 |
| 5,188,885 | 2/1993 | Timmons et al. | 428/198 |
| 5,258,156 * | 11/1993 | Kurauchi et al. | 264/154 |
| 5,262,107 | 11/1993 | Hovis et al. | 264/145 |
| 5,378,414 | 1/1995 | Derkach | 264/22 |
| 5,382,400 | 1/1995 | Pike et al. | 264/168 |
| 5,382,461 | 1/1995 | Wu | 428/86 |
| 5,409,761 | 4/1995 | Langley . | |
| 5,571,619 | 11/1996 | McAlpin et al. | 428/364 |
| 5,800,758 * | 9/1998 | Topolkaraev et al. | 264/154 |
| 6,016,764 | 1/2000 | McCormack . | |
| 6,075,179 | 6/2000 | McCormack . | |

FOREIGN PATENT DOCUMENTS

| | | | |
|---|---|---|---|
| 0 236 091 | 9/1987 | (EP) | D04H/3/16 |
| 0311423 | 12/1989 | (EP) . | |
| 0 604 731 | 7/1994 | (EP) | B32B/31/00 |
| 0 691 203 | 2/1996 | (EP) | B32B/31/04 |
| 95/16562 | 6/1995 | (WO) . | |
| 96/19346 | 6/1996 | (WO) . | |
| 96/19349 | 6/1996 | (WO) . | |

* cited by examiner

Primary Examiner—Leo B. Tentoni
(74) Attorney, Agent, or Firm—Douglas H. Tulley, Jr.

(57) ABSTRACT

Breathable barriers, comprising a thermoplastic polymer and at least 30% by weight filler, are stretched in one direction in multiple discrete steps wherein the strain rate of each discrete stretching step is less than about 100,000%/minute and wherein the line speed of the last stretching step is in excess of 500 feet per minute. The resulting films may be stretched, as a result of the cumulative discrete stretching operations, from about 2 to 7 times its original length in order to create a breathable barrier having a WVTR in excess of 800 g/m²/day and a hydrohead of at least 60 cm.

56 Claims, 1 Drawing Sheet

METHODS OF MAKING STRETCHED FILLED MICROPOROUS FILMS

FIELD OF THE INVENTION

The present invention relates to stretched filled films. More particularly, the present invention relates to improved methods of making breathable stretched filled films.

BACKGROUND OF THE INVENTION

There exist a variety of fabrics today which are capable of acting as a barrier to particulate matter, water and other liquids yet which allow water vapor and air to pass therethrough. Such fabrics are commonly referred to as "breathable barriers." Breathable barrier fabrics have been employed in outdoor fabrics, tarpaulins, garments, personal care products, infection control products, as well as numerous other articles. Moreover breathable barrier fabrics are often preferred over non-breathable barrier materials since breathable barrier fabrics allow moisture trapped beneath the fabric to escape as water vapor. Thus, apparel using breathable barriers is generally more comfortable to wear since the migration of water vapor through the fabric helps to reduce and/or eliminate discomfort resulting from excess moisture trapped against the skin.

While a variety of breathable barrier fabrics are known in the art, one particularly useful breathable barrier comprises stretched filled microporous films. Such films are typically filled with particles and then crushed or stretched to form a fine pore network which creates tortuous paths through the film. The film pore network allows gas and water vapor to pass through the film while acting as a barrier to liquids or particulate matter. The amount of filler within the film and the degree of stretching is controlled so as to create a microporous network of tortuous paths which are of a size and/or frequency to impart the desired level of breathability to the fabric. An example of stretched filled film is described in U.S. Pat. No. 4,777,073 issued to Sheth which discloses a stretched filled polyolefin film filled with about 15 to 35% by volume calcium carbonate which can be stretched to about four times its original length.

While filled microporous films are capable of providing good barrier properties and breathability, efficient commercialization and practical applications of such films requires relatively low defect rates. The barrier properties of stretched filled films may be compromised by defects such as macroscopic holes or zones of weakness in the film. This is of enormous concern where the film is intended to act as a barrier to urine, blood or other potentially hazardous materials. However, the process of stretching the filled films to the required degree, while acting to orient the film and also make the film microporous, also has the adverse effect of creating many of the defects. Thus, the process and manner in which such films are produced can have a significant impact upon the number and frequency of defects within the stretched-thinned films. It therefore follows that methods which produce less defects create superior films and have the added benefit of being more efficient in the sense of creating less unusable or defective product.

Unfortunately, the production of stretched filled films at higher production rates can significantly increase the propensity for defects within the stretched filled film as well as creating other more serious manufacturing problems which can cause process line shutdowns. However, the ability to produce stretched filled films at increased rates is often desirable although any benefits to be achieved by increased rates of manufacture are reduced and/or entirely eliminated where the increased production rate also increase the level of defects and downtime of the production line.

Thus, there exists a need for an improved method of making stretched filled films. Moreover, there exists a need for a method of making stretched filled films which have reduced levels of defects and which are more tolerant of film irregularities during stretching. Further, there exists a need for such a method of making stretched filled films and, in particular a method of making breathable barriers, which allows for increased rates of production, improved efficiencies and wider processing windows.

SUMMARY OF THE INVENTION

The aforesaid needs are fulfilled and problems experienced by those skilled in the art overcome by a method of making a breathable barrier, comprising (i) heating a precursor film comprising a thermoplastic polymer and filler; and (ii) stretching the precursor film in a series of discrete stretching steps wherein each stretching step has a strain rate of less than 100,000%/minute and further wherein the speed of the stretched filled film at the last stretching step is in excess of 500 feet per minute. The series of discrete stretching steps incrementally stretch the precursor film in substantially the same direction, desirably stretching the precursor film in the machine direction. The precursor film may be cumulatively stretched by the discrete stretching steps at least 1.5 times its original length and in a further aspect is desirably stretched from about 50% to 90% of elongation at break. In a further aspect the strain rate of each of the stretching steps can be less than 75,000%/minute and, even more desirably, less than 50,000%/minute.

In a further aspect, a support fabric, traveling at substantially the same speed as the stretched film, is superposed with the stretched film and laminated thereto such as, for example, by thermal point bonding, adhesive bonding, ultrasonic bonding and the like. The support layer may comprise any of various breathable materials such as, for example, a nonwoven web. In an additional aspect of the invention, the precursor film may comprise a polyolefin based polymer and at least 50% by weight of a particulate filler which is stretched from 2 to 7 times its original length and wherein the basis weight of the resulting stretched film is less than about 35 gsm.

In a further aspect of the invention, the methods described above can be practiced at line speeds in excess of 750 feet per minute (fpm), 1000 fpm, 1250 fpm, 1500 fpm and even 2000 fpm. Further, the average strain rate of the discrete stretching operations desirably is less than about 70,000%/minute. In a further aspect, the precursor film may be incrementally stretched over two or three stretching steps and further stretched such that the strain rate for each stretching step is less than 70,000%/minute and 50,000%/minute respectively. Films made in accord with the methods described above can have a WVTR in excess of 800 g/M$^2$/day while retaining hydrohead values in excess of about 60 cm. Still further, breathable barrier materials made in accord with the present invention may have a WVTR in excess of 1500 g/M$^2$/day and even 3000 g/M$^2$/day. The films made in accord with the present invention may further have hydrohead values in excess of 80 cm, 150 cm and even 300 cm.

DEFINITIONS

Figure 1:
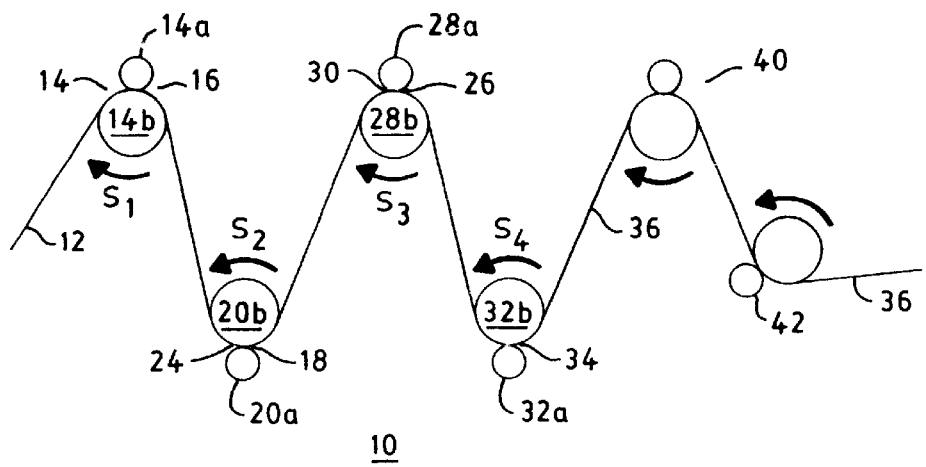
FIG. 1 is a schematic diagram of a process line suitable for making a stretched filled film in accord with the present invention.

As used herein the term "nonwoven" fabric or web means a web having a structure of individual fibers or threads which are interlaid, but not in an identifiable manner as in a knitted fabric. Nonwoven fabrics or webs have been formed by many processes such as for example, meltblowing processes, spunbonding processes, hydroentangling, air-laid and bonded carded web processes.

As used herein the term "spunbond fibers" refers to small diameter fibers of molecularly oriented polymeric material. Spunbond fibers may be formed by extruding molten thermoplastic material as filaments from a plurality of fine, usually circular capillaries of a spinneret with the diameter of the extruded filaments then being rapidly reduced as by, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,542,615 to Dobo et al, and U.S. Pat. No. 5,382,400 to Pike et al. Spunbond fibers are generally not tacky when they are deposited onto a collecting surface and are generally continuous. Spunbond fibers are often about 10 μm in diameter. However, fine fiber spunbond webs (having a fiber diameter less than about 10 μm) may be achieved by various methods including, but not limited to, those described in commonly assigned U.S. patent applications Ser. No. 08/756,426 filed Nov. 26, 1996 to Marmon et al. and application Ser. No. 08/565,261 filed Jun. 7, 1995 to Pike et al now U.S. Pat. No. 5,759,926.

As used herein the term "meltblown fibers" means fibers of polymeric material which are generally formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter. Thereafter, the meltblown fibers can be carried by the high velocity gas stream and are deposited on a collecting surface to form a web of randomly dispersed meltblown fibers. Such a process is disclosed, for example, in U.S. Pat. No. 3,849,241 to Butin et al. Meltblown fibers may be continuous or discontinuous, are generally smaller than 10 microns in average diameter, and are generally tacky when deposited onto a collecting surface.

As used herein "multilayer nonwoven laminate" means a laminate wherein some of the layers are spunbond and some meltblown such as a spunbond/meltblown/spunbond (SMS) laminate and others as disclosed in U.S. Pat. No. 4,041,203 to Brock et al., U.S. Pat. No. 5,169,706 to Collier, et al, U.S. Pat. No. 5,145,727 to Potts et al., U.S. Pat. No. 5,178,931 to Perkins et al. and U.S. Pat. No. 5,188,885 to Timmons et al. Such a laminate may be made by sequentially depositing onto a moving forming belt first a spunbond fabric layer, then a meltblown fabric layer and last another spunbond layer and then bonding the laminate such as by thermal point bonding as described below. Alternatively, the fabric layers may be made individually, collected in rolls, and combined in a separate bonding step.

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" includes all possible geometrical configurations of the molecule. These configurations include, but are not limited to isotactic, syndiotactic and random symmetries.

As used herein, the term "machine direction" or MD means the length of a fabric in the direction in which it is produced. The term "cross machine direction" or CD means the width of fabric, i.e. a direction generally perpendicular to the MD.

As used herein, the terms "necking" refers to the reduction in width of a material experienced upon elongating the same.

As used herein the term "strain rate" is calculated as follows:

Strain rate(percent/minute)=[Δspeed over the stretch gap(inches/minute)÷distance of the stretch gap(inches)]×draw ratio(percent stretch of film).

As used herein "whitening" of the film refers to the opacity of a film, when starting with a transparent or translucent film, wherein the film becomes uniformly opaque as a result of light defraction caused by orientation of the filler particles and the microporous voids formed within the film. The "whitening" point is generally achieved in the range of about 50% to 90% of the elongation at break.

As used herein the term "flexible polyolefin" refers to polyolefin materials containing propylene based polymer with atactic polypropylene units such as described in U.S. patent application Ser. No. 08/775,087 filed Dec. 30, 1996 entitled "Oriented Polymeric Microporous Films with Flexible Polyolefins and Methods of making the Same" to Hetzler and Jacobs now U.S. Pat. No. 5,910,136; the entire contents of which are incorporated herein by reference.

As used herein the term "blend" means a mixture of two or more polymers while the term "alloy" means a sub-class of blends wherein the components are immiscible but have been compatibilized.

As used herein, "ultrasonic bonding" means a process performed, for example, by passing the fabric between a sonic horn and anvil roll as illustrated in U.S. Pat. No. 4,374,888 to Bornslaeger.

As used herein "thermal point bonding" involves passing one or more layers to be bonded between a heated engraved pattern roll and a smooth calender roll. The engraved roll is, patterned in some way so that the entire fabric is not bonded over its entire surface, and the anvil roll is usually flat. As a result, various patterns for engraved rolls have been developed for functional as well as aesthetic reasons. One example of a pattern has points and is the Hansen Pennings or "H&P" pattern with about a 30% bond area when new and with about 200 bonds/square inch as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5% when new. Another typical point bonding pattern is the expanded Hansen Pennings or "EHP" bond pattern which produces a 15% bond area when new with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches, a spacing of 0.062 inches (1.575 mm) between pins, and a depth of bonding of 0.033 inches (0.838 mm). The resulting pattern has a bonded area of about 15% when new. Yet another common pattern is the C-Star pattern which has, when new, a bond area of about 16.9%. The C-Star pattern has a cross-directional bar or "corduroy" design interrupted by shooting stars. Other common patterns include a diamond pattern with repeating and slightly offset diamonds with about a 16% bond area and a wire weave pattern looking as the name suggests, e.g. like a window screen, with about a 15% bond area. Typically, the percent bonding area varies from around 10% to around 30% of the area of the fabric laminate web. As is well known in the art, the spot bonding holds the laminate layers together as well as imparts integrity to each individual layer by bonding filaments and/or fibers within each layer.

As used herein, the term "barrier" means a film, laminate or other fabric which is relatively impermeable to the transmission of liquids and which has a hydrohead of at least 60 cm. Hydrohead as used herein refers to a measure of the liquid barrier properties of a fabric. The hydrohead test determines the height of water (in centimeters) which the fabric will support before a predetermined amount of liquid passes through. A fabric with a higher hydrohead reading indicates it has a greater barrier to liquid penetration than a fabric with a lower hydrohead. The hydrohead test is performed according to Federal Test Method Standard 191A, Method 5514. However, it should be noted that in many applications of stretched filled films of the present invention it may be desirable that they have a hydrohead value greater than about 80 or even 300 cm.

As used herein, the term "breathable" refers to a material which is permeable to water vapor having a minimum WVTR of about 300 g/M$^2$/24 hours. The WVTR of a fabric is water vapor transmission rate which, in one aspect, gives an indication of how comfortable a fabric would be to wear. WVTR (water vapor transmission rate) is measured in accordance with ASTM Standard Test Method for Water Vapor Transmission of Materials, Designation E-96-80 and the results are reported in grams/square meter/day. However, often applications of breathable barriers desirably have higher WVTRs and breathable barriers of the present invention can have WVTRs exceeding about 800 g/M$^2$/day, 1500 g/M$^2$/day or even about 3000 g/M$^2$/day.

As used herein the term "basis weight" refers to the mass of a film or other material per unit area, such as in grams per square meters (gsm). The basis weight of a material may be determined in accord with Federal Test Method Standard No. 191A, Method 5514.

As used herein, the term "garment" means any type of non-medically oriented apparel which may be worn. This includes industrial workwear and coveralls, undergarments, pants, shirts, jackets, gloves, socks, and the like.

As used herein, the term "infection control product" means medically oriented items such as surgical gowns and drapes, face masks, head coverings like bouffant caps, surgical caps and hoods, footwear like shoe coverings, boot covers and slippers, wound dressings, bandages, sterilization wraps, wipers, garments like lab coats, coveralls, aprons and jackets, patient bedding, stretcher and bassinet sheets, and the like.

As used herein, the term "personal care product" means diapers, training pants, absorbent underpants, adult incontinence products, and feminine hygiene products.

As used herein, the term "protective cover" means a tarpaulin or cover for vehicles such as cars, trucks, boats, airplanes, motorcycles, bicycles, golf carts, etc., covers for equipment often left outdoors like grills, yard and garden equipment (mowers, rototillers, etc.) and lawn furniture, as well as floor coverings, table cloths and picnic area covers.

As used herein, the term "outdoor fabric" means a fabric which is primarily, though not exclusively, used outdoors. Outdoor fabric includes fabric used in protective covers, camper/trailer fabric, tarpaulins, awnings, canopies, tents, agricultural fabrics and outdoor apparel such as head coverings, industrial workwear and coveralls, pants, shirts, jackets, gloves, socks, shoe coverings, and the like.

DESCRIPTION OF THE PREFERRED EMBODIMENTS

Suitable precursor films, as described in more detail below, may be provided in roll from or made in-line. Prior to stretching, however, the precursor film is heated to impart the desired amount of energy to the film. The film can be heated prior to stretching such as, for example, by one or more heated rollers. The filled films are heated at a temperature and for a duration insufficient to cause the film to reach its melting point but sufficient to allow the filled film to stretch without breaking. As an example, referring to FIG. 1, the film 12 may be heated by heated roller 14b.

The filled film may be stretched upon heating. Still referring to FIG. 1, the precursor film 12 is heated while contacting heated roller 14b as it passes through the first roller assembly 14 and nip 16. The pressure between the rollers at nip 16 and subsequent nips should be sufficient to prevent slippage of the film there between as is known to those skilled in the art. The film 12 travels from nip 16 of the first roller assembly 14 to nip 18 of the second roller assembly 20. The circumferential speed $S_1$ of the first roller assembly 14 and the speed $S_2$ of the second roller assembly 20 is selected such that $S_1$ is less than $S_2$. The difference in the respective circumferential speeds of the first and second roller assemblies, and hence the line speeds of the precursor film, causes the filled film to stretch a first amount in the machine direction forming a first partially-stretched filled film 24.

The partially-stretched film 24 continues through the second roller assembly 20 and may be further heated by heated roller 20b. The partially-stretched film 24 travels from nip 18 of the second roller assembly 20 to nip 26 of the third roller assembly 28. The circumferential speed $S_2$ of the second roller assembly 20 is less than the circumferential speed $S_3$ of the third roller assembly 28. Thus, the partially-stretched film 24 is further stretched in the machine direction. Optionally, additional sequential and discrete stretching steps may be employed as desired. Desirably the precursor films are stretched in from 2 to 5 discrete stretching steps. As shown in the embodiment of FIG. 1, the partially-stretched film 30 undergoes a third stretching step upon traveling from nip 26 of the third roller assembly to nip 34 of the fourth roller assembly 32. The partially-stretched film 30 may again be further heated by roller 28b prior to the additional stretching. The number of discrete stretching operations and the degree of stretch experienced by the film in each step may be selected to achieve the cumulative degree of stretch desired. As indicated below, in order to obtained the desired breathability precursor films are often stretched from about 2 to 7 times their original length. The multiple discrete stretching operations or steps create stretched filled film 36 which has been stretched a desired degree.

It has been found that in order to achieve line speeds of about 500 feet per minute (fpm) or more while retaining the efficiency and quality achievable through single stretch processes at lower speeds, each of the discrete stretching operations should be configured such that the strain rate of the stretching operation is less than about 100,000 percent per minute (%/minute). Desirably each of the individual stretching operations has a strain rate less than about 75,000%/minute and even more desirably under about 50,000%/minute. A preferred method of making the stretched films can comprise stretching the precursor film in two or more discrete operations wherein the strain rate of each operation falls between 1,000 and 100,000%/minute and more desirably between about 1,000 and 70,000%/minute. By employing multiple discrete stretching operations with the aforesaid strain rates it is also possible to achieve line speeds in excess of 750 fpm, 1000 fpm, 1250 fpm and even 2000 fpm while making stretched films with excellent breathability, good barrier properties and without significantly increased defect rates.

With reference to FIG. 1, the strain rate of the first stretching step, which forms partially-stretched film 24, would be calculated as follows. The change in speed of sequential roller assemblies, A speed, would be the difference in the circumferential speed $S_1$ of the first roller assembly 14 with respect to the circumferential speed $S_2$ of the second roller assembly 20. The stretch gap would be the distance along the path of the precursor film between the adjacent roller assemblies, which in reference to the embodiment of FIG. 1 is the distance between nips 16 and 18. In this regard, it should be noted that the distance along which the film actually stretches may be less than the entire distance between the two roller assemblies. The actual stretching distance will vary depending on the temperature of the film, polymer composition, amount of filler and other factors. However, for purposes of calculating strain rate herein, it is intended that the entire distance, along the path of the film, between the two stretching apparatus will comprise the "stretch gap". The draw ratio represents the percent of stretch imparted to the partially-stretched film 24 as a result of the first stretching operation. The strain rate of the subsequent discrete stretching operations shown in FIG. 1 would be calculated in a similar manner.

Thus, the values of the above process parameters necessary to achieve the desired strain rates in stretching the precursor film will vary with respect to one another. Moreover, these values can be selected in accord with the composition of the precursor film, the configuration of the stretching apparatus (i.e. available stretch gap lengths) and operating speeds in order to achieve a stretched film having the desired characteristics (i.e. breathability, thickness etc.). Desirably the draw ratio of the film at each individual stretching operation does not exceed 500% and more desirably the draw ratio of each discrete stretching operation falls between about 110% and about 300%. In a preferred embodiment each of the stretching operations has a substantially similar draw ratio and strain rate. In addition, desirably the stretch gap is less than about 50 inches and even more desirably between about 10 and 30 inches.

As a result of the aforesaid stretching and thinning process many of the filled films undergo a change in opacity. Typically, as formed the film is relatively transparent but after stretching, it becomes uniformly opaque which is often referred to as whitening. As indicated above the film becomes oriented during the stretching process. In order to impart the breathability desired in many articles, the film is stretched in a single direction, as a result of the multiple stretching steps, at least about 1.5 times its original length, that is having a cumulative draw ratio over about 150%. Often the film will be stretched from 2 to about 7 times its original length in order to reach the whitening point or to impart the desired thickness and breathability to the stretched film. However, the degree of stretch required to impart the desired breathability will vary with polymer composition, initial gauge and various aspects of the filler. After the final stretching step, the stretched film desirably has a basis weight of less than 50 gsm and even more desirably between about 5 gsm and about 35 gsm.

After stretching, the stretched film is desirably annealed, that is heating of the film without application of a significant stretching force. As an example and in reference to FIG. 1, the stretched film 36 may be heated by a series of heated rollers 40 and 42 which have a circumferencial speed substantially similar to that of the fourth roller assembly 32. The stretched film may then be further processed as desired. In a further aspect the stretched film can, in addition to or as an alternative to annealing, be slightly retracted or relaxed after the final stretching step by employing one or more subsequent roller assemblies operating at slightly slower speeds.

Figure 2:
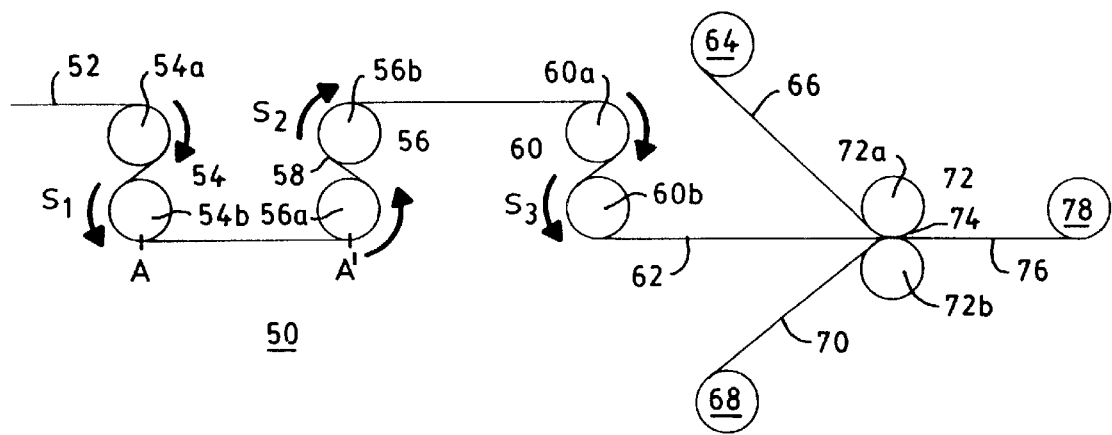
FIG. 2 is a schematic diagram of a process line for making a stretched filled film laminate in accord with the present invention.

It will be appreciated that other aspects of the process line may be varied in order to practice the method of the present invention. As an example of an alternative process line 50, in reference to FIG. 2, precursor film 52 is provided and enters a heated stacked or S-roll assembly 54 which heats the film to the desired degree. Additional heated rollers or other heating means may be added as desired to increase the amount of energy imparted to the film. The film travels from the first S-roll assembly 54, having a speed $S_1$, to second S-roll assembly 56 having a speed $S_2$. The circumferential speed $S_1$ and $S_2$ of the respective roller assemblies is selected such that the speed $S_2$ of the second roller assembly 56 is greater than the speed $S_1$ of the first roller assembly 54. Thus, the film 52 stretches a desired amount within the stretch gap, shown as A to $A^1$ in FIG. 2 which is the distance along the path of the film between rollers 54b and 56a. Preferably the second roller assembly 56 employs one or more heated rolls to further heat partially-stretched film 58. The partially-stretched film 58 travels through the second roller assembly 56 and then to the third roller assembly 60. The circumferential speed $S_2$ of the second roller assembly 56 is slower than the speed $S_3$ of the third roller assembly 60 and, thus, the partially-stretched film 58 is stretched a further amount forming stretched filled film 62. The stretched film can be annealed by traveling through heated rollers 60a and 60b of the third roller assembly 60. Stretched film 62 can then travel from the third roller assembly 60 to nip 74 formed by a patterned roll 72a and a flat calender roll 72b. Support layers 66 and 70 are unwound from unwind rolls 64 and 68 respectively, the line speed of the support fabrics being substantially the same speed as the stretched film after the final stretching operation. For example, as shown in FIG. 2, the speed of the unwind rolls 64 and 68 can be adjusted to be substantially the same as that of the third roller assembly 60. The support fabrics 66 and 70 enter nip 74 on opposed sides of stretched film 62 and the multiple layers pass through nip 74 of bonding rolls 72. In the embodiment shown in FIG. 2, the multiple layers are thermally point bonded by rolls 72a and 72b thereby forming laminate 76. The laminate 76 may then be wound on winder roll 78 or further processed as desired.

It will be appreciated by those skilled in the art that variations in the process equipment and design may be made without departing from the scope of the present invention. As an example, the precursor film and/or the support fabrics 66 and 70 may be made in-line in lieu of being unwound from winder rolls. As a further example, the film may be additionally stretched in directions other than that of the multiple stretching steps. Still further, additional means for improving the contact between the film and heated rollers may likewise be employed. Yet another variation includes the use of other conventional drive means and/or heating devices in connection with the present invention.

Suitable precursor films or filled films include a thermoplastic polymer and a filler. These (and other) components can be mixed together, heated and then extruded into a mono-layer or multilayer film. The film may be made by any one of a variety of film forming processes known in the art such as, for example, by using either cast or blown film equipment. The precursor film may then be stretched in accord with the process of the present invention. The precursor film, prior to stretching, desirably has a basis weight of less than about 100 grams per square meter (gsm) and even more desirably less than about 50 gsm. In addition, suitable filled films may include multilayer films such as, for example, films formed by co-extrusion having a core layer and one or more skin layers. As an example, stretched filled films having skin layers are disclosed in U.S. patent application Ser. No. 08/724,435 filed Oct. 1, 1996 to McCormack et al. now U.S. Pat. No. 6,075,179, the entire contents of which are incorporated herein by reference. Additionally, methods of forming multilayer films are disclosed in U.S. Pat. No. 4,522,203; U.S. Pat. No. 4,494,629; and U.S. Pat. No. 4,734,324.

The precursor film 12 can be made from any thermoplastic polymer which can be stretched in at least one direction, thereby reducing the film gauge or thickness. Thermoplastic polymers used in the fabrication of the films of the present invention include, but are not limited to, polyolefins including homopolymers, copolymers, terpolymers and blends thereof. In addition, "polyolefin based" films are also believed suitable for use in the present invention. For purposes of the present invention a film is considered to be "polyolefin-based" if the polymeric portion of the film, exclusive of any filler materials, has at least 50 weight percent polyolefin. Additional film forming polymers which may be suitable for use with the present invention, alone or in combination with other polymers, include ethylene vinyl acetate (EVA), ethylene ethyl acrylate (EEA), ethylene acrylic acid (EAA), ethylene methyl acrylate (EMA), ethylene normal butyl acrylate (EnBA), polyester (PET), nylon, ethylene vinyl alcohol (EVOH), polystyrene (PS), polyurethane (PU), polybutylene (PB), and polybutylene terepthalate (PBT). However, predominantly linear polymers are preferred such as, for example, polymers of ethylene, propylene, 1-butene, 4-methyl-pentene, 1-hexene, 1-octene and the like as well as copolymers and blends thereof. In one embodiment polymers of ethylene and/or propylene are employed with the stretched filled films; examples include, but are not limited to, linear low density polyethylene (LLDPE), high density polyethylene (HDPE), flexible polyolefins and ethylene-propylene copolymer blends. In a further embodiment, the polyolefin polymers may comprise polymers which are multi-step reactor products wherein an amorphous ethylene propylene random copolymer is molecularly dispersed in a predominantly semicrystalline high polypropylene monomer/low ethylene monomer continuous matrix.

In addition to the thermoplastic polymer, the precursor film includes a filler to impart breathability to the film upon stretching. As used herein a "filler" is meant to include particulates and/or other forms of materials which can be added to the film polymer extrusion blend and which will not chemically interfere with or adversely affect the extruded film and further which are capable of being uniformly dispersed throughout the film. Generally the fillers will be in particulate form with average particle sizes in the range of about 0.1 to 10 microns, desirably from 0.1 to 4 microns. As used herein the term "particle size" describes the largest dimension or length of a filler particle. Both organic and inorganic fillers are contemplated for use with the present invention provided they do not interfere with the film forming process and/or subsequent laminating processes. Examples of fillers include calcium carbonate ($CaCo_3$), various clays, silica ($SiO_2$), alumina, barium sulfate, sodium carbonate, talc, magnesium sulfate, titanium dioxide, zeolites, aluminum sulfate, cellulose-type powders, diatomaceous earth, gypsum, magnesium sulfate, magnesium carbonate, barium carbonate, leaolin, mica, carbon, calcium oxide, magnesium oxide, aluminum hydroxide, pulp powder, wood powder, cellulose derivatives, polymeric particles, chitin and chitin derivatives. The filler particles may optionally be coated with a fatty acid, such as stearic acid or behenic acid, or other material in order to facilitate the free flow of the particles (in bulk) and their ease of dispersion into the polymer. In a preferred embodiment, the filler particles comprise small particle size calcium carbonate coated with a fatty acid. The precursor film will usually contain at least 30% filler based upon the total weight of the film layer, more desirably from about 45% to 70% by weight filler.

In addition, the precursor film may optionally include one or more stabilizers. Desirably the filled film includes an anti-oxidant such as, for example, a hindered phenol stabilizer. Commercially available hindered phenol stabilizers include, but are not limited to, IRGANOX® E 17 (α-tocopherol) and IRGANOX® 1076 (octodecyl 3,5-di-tert-butyl-4-hydroxyhydrocinnamate) which are available from Ciba Specialty Chemicals of Terrytown, N.Y. Desirably about 100 to 1000 ppm of a hindered phenol is added to the base polymer(s) prior to extrusion. (Parts per million is in reference to film weight.)

In addition, other stabilizers or additives which are compatible with the film forming process, stretching and any subsequent lamination steps may also be employed with the present invention. For example, additional additives may be added to impart desired characteristics to the film such as, for example, melt stabilizers, processing stabilizers, heat stabilizers, light stabilizers, heat aging stabilizers and other additives known to those skilled in the art. Generally, phosphite stabilizers (i.e. IRGAFOS® 168 available from Ciba Specialty Chemicals of Terrytown, N.Y. and DOVERPHOS® available from Dover Chemical Corp. of Dover, Ohio) are good melt stabilizers whereas hindered amine stabilizers (i.e. CHIMASSORB® 944 and 119 available from Ciba Specialty Chemicals of Terrytown, N.Y.) are good heat and light stabilizers.

Bonding agents such as tackifiers may also be added to the precursor film. Bonding agent tackifying resins are discussed in U.S. Pat. No. 4,789,699 to Kieffer et al., the contents of which are incorporated herein by reference in their entirety. The purpose of the bonding agent in the present invention is to permit bonding of the film and nonwoven layers at a lower temperature. Examples of bonding agents include hydrogenated hydrocarbon resins such as REGALREZ® series tackifiers and ARKON® P series tackifiers. REGALREZ® tackifiers are available from Hercules, Incorporated of Wilmington, Del. REGALREZ® tackifiers are highly stable, light-colored, low molecular weight, nonpolar resins. REGALREZ® 3102, 1094 are examples of suitable commercially available bonding agents for use in conjunction with the present invention. Further examples of suitable bonding agents include the following: ARKON® P series resins which are synthetic tackifying resins made by Arakawa Chemical (U.S.A.), Incorporated of Chicago, Ill. from petroleum hydrocarbon resins; ZONA-TAC® 501 lite resin is another tackifier which is a terpene hydrocarbon made by Arizona Chemical Company of Panama City, Fla.; EASTMAN® 1023PL resin is an amorphous polypropylene tackifying agent available from Eastman Chemical Company Longview,Tex.

Generally, other examples of bonding agents include, but are not limited to, polyamides, ethylene copolymers such as ethylene vinyl acetate (EVA), ethylene ethyl acrylate (EEA), ethylene acrylic acid (EAA), ethylene methyl acrylate (EMA) and ethylene normal-butyl acrylate (EnBA), wood rosin and its derivatives, hydrocarbon resins, polyterpene resins, atactic polypropylene and amorphous polypropylene. Also included are predominately amorphous ethylene propylene copolymers commonly known as ethylene-propylene rubber (EPR) and a class of materials referred to as toughened polypropylene (TPP) and olefinic thermoplastic polymers where EPR is mechanically dispersed or molecularly dispersed via in-reactor multistage polymerization in polypropylene or polypropylene/polyethylene blends.

It should be understood that the foregoing list of bonding or tackifying agents is illustrative only. Generally the bonding agent can comprise from about 2 to about 20 percent of the total weight of the precursor film. While weight percentages outside the range can be used, at higher percentages the breathability of the film becomes compromised which, for garments or personal care articles, is generally not desirable.

The stretched films of the present invention may be employed in a variety of applications including use in garments, infection control products, personal care products, outdoor fabrics, protective covers and other articles or fabrics requiring barrier properties. Typically the breathable film will be laminated to one or more support layers such as, for example, nonwoven webs, scrims, woven fabrics, foams or other breathable materials. In a preferred embodiment the support layers may comprise breathable nonwoven webs of bonded/carded staple fibers, spunbond fibers, meltblown fibers or multilayer nonwoven laminates. The stretched film and support layers may be laminated by means known to those skilled in the art including, but not limited to, thermal point bonding, ultrasonic bonding and adhesive bonding. Desirably thermal point bonding and ultrasonic bonding is achieved at numerous isolated spaced apart locations and more desirably using a bond pattern with a total bond area of less than about 35% of the surface area of the fabric, and even more desirably between about 10 and 25%. Further, adhesive may likewise be applied in a non-continuous manner or pattern across the film and/or support layers. Suitable methods of forming the breathable film/support layer(s) laminates are disclosed in commonly assigned U.S. patent application Ser. No. 08/755,692 filed Nov. 25, 1996 now U.S. Pat. No. 5,695,868; application Ser. No. 08/359,986 filed Dec. 20, 1994 now abandoned; application Ser. No. 08/722,726 filed Oct. 1,1996 now abandoned; and application Ser. No. 08/777,365 filed Dec. 27, 1996 now U.S. Pat. No. 6,031,287; the entire contents of the aforesaid applications are incorporated herein by reference. To the extent there exists any conflict between the written description of the present invention and that of any incorporated reference, the written description controls for purposes of the present invention.

Figure 3:
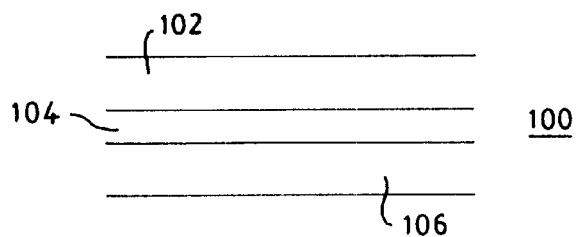
FIG. 3 is a side view of a stretched filled film/nonwoven laminate.

Referring to FIG. 3, there is shown a stretched film/nonwoven laminate 100 which may be made in accord with the present invention including a first stretched film 104 and opposed nonwoven web support layers 102 and 106 on opposed sides of the film 104. The laminate can contain additional film and/or support layers such as, for example, a spunbond/film/spunbond laminate, spunbond/film/film/spunbond, etc.

EXAMPLE 1

A 57.2 gsm precursor film comprising 60% by weight FILMLINK 2029 $CaCO_3$ from English China Clay, 23.4% Union Carbide 6D82 (7 MFR propylene/ethylene copolymer comprising about 5.5% ethylene), 16.5% Montell K5359 (13 MFR Catalloy copolymer), 1000 ppm Irganox 1076 and 400 ppm Irgafos 168. Using a machine direction orientor configured similar to that described in FIG. 1, the film was initially heated by a heated roller at about 200° F. and a circumferential speed of 143 feet per minute (fpm). The gap length between the first roller assembly and second roller assembly was 40.3 inches and the line speed of the second roller assembly was 208 fpm. The difference in the speeds of the first and second roller assemblies initially stretched the film in the machine direction, having a draw ratio of 145%. Thus, the first stretching step had a strain rate of about 2815%/minute[strain rate=(((208 fpm−143 fpm) (12 inches/foot))÷40.3 inches)×145%]. The second roller assembly also had a heated roller at 185° F. The line-speed of the third roller assembly was 333 fpm and the gap length between the second and third roller assembly was 19.1 inches. The partially stretched film was again stretched in machine direction, between the second and third roller assemblies, having a draw ratio of about 160% and a strain rate of about 12573%/minute. The fourth roller assembly had a line speed of 500 fpm and the gap distance between the third and forth roller assemblies was 19.1 inches. Thus, the film was further stretched in the machine direction, having a draw ratio of about 150% and a strain rate of about 15754%/minute. The third roller assembly employed a heated roller at about 185° F. and the film was passed over a series of additional rollers at 72° F. and 210° F. The resulting stretched film had a cumulative stretch or draw ratio of 340% (relative to the original unstretched filled film) and a basis weight of 23.3 gsm. The stretched film laminate had a WVTR of 1273 $g/M^2/day$ and a hydrohead value of 105 cm. The stretched filled film was laminated in-line to a 0.5 osy spunbond web of monocomponent polypropylene fibers by thermal point bonding with a C-star pattern having a bond area of about 15%.

While the invention has been described in detail with respect to specific embodiments thereof, and particularly by the examples described herein, it will be apparent to those skilled in the art that various alterations, modifications and other changes may be made without departing from the spirit and scope of the present invention. It is therefore intended that all such modifications, alterations and other changes be encompassed by the claims.

We claim:

1. A method of making a breathable barrier film, comprising:

heating a precursor film, said precursor film comprising a thermoplastic polymer and filler; and stretching said precursor film in a plurality of discrete stretching steps to form a stretched breathable barrier film wherein the plurality of discrete stretching steps each has a strain rate of less than about 100,000%/minute and further wherein the speed of said stretched film at the last stretching step of said plurality of discrete stretching steps is in excess of 500 feet per minute.

2. A method according to claim 1 wherein the plurality of discrete stretching steps cumulatively stretch said precursor film in excess of 1.5 times its original length and further wherein the stretched film has a basis weight of less than about 50 gsm.

3. A method according to claim 2 wherein the speed of said stretched film at the last stretching step of said plurality of discrete stretching steps is in excess of 750 feet per minute.

4. A method according to claim 2 wherein the speed of said stretched film at the last stretching step of said plurality of discrete stretching steps is in excess of 1000 feet per minute.

5. A method according to claim 2 wherein the strain rate of each of said discrete stretching steps is less than 75,000%/minute.

6. A method according to claim 2 wherein the strain rate of each of said discrete stretching steps is less than 50,000%/minute.

7. A method according to claim 5 wherein the precursor film is stretched at first and second discrete stretching steps.

8. A method according to claim 6 wherein the precursor film is stretched at first, second and third discrete stretching steps.

9. A method according to claim 2 wherein after the plurality of stretching steps a support fabric, traveling at substantially the same speed as the stretched film, is superposed with and laminated to said stretched film.

10. A method according to claim 9 wherein said support fabric is a nonwoven web of thermoplastic fibers.

11. A method according to claim 10 wherein said nonwoven web is laminated to said stretched film by the method selected from the group consisting of thermal point bonding, ultrasonic bonding and adhesive bonding.

12. A method according to claim 9 wherein the precursor film comprises a polyolefin based polymer and at least 50% calcium carbonate filler and wherein said support fabric comprise a polyolefin nonwoven web.

13. A method according to claim 9 wherein the precursor film has at least 30% by weight filler and is cumulatively stretched by said plurality of discrete stretching steps to within 50% to 90% of elongation at break.

14. A method according to claim 9 wherein the plurality of discrete stretching steps stretch said precursor film from 2 to about 7 times its original length and wherein the stretched film has a WVTR in excess of 800 g/M$^2$/24 hours.

15. A method according to claim 14 wherein the precursor film comprises at least about 45% by weight filler and wherein the stretched film has a basis weight of less than about 35 gsm.

16. A method according to claim 15 wherein said thermoplastic polymer comprises a polyolefin based polymer.

17. A method according to claim 16 wherein said filler comprises calcium carbonate having a particle size less than about 10 microns.

18. A method according to claim 2 wherein the speed of said breathable barrier at the last stretching step of said plurality of discrete stretching steps exceeds 750 feet per minute and wherein the average strain rate of the plurality of discrete stretching steps is less than 70,000%/minute.

19. A method according to claim 18 wherein the strain rate of each stretching step is less than about 50,000%/minute.

20. A method according to claim 18 wherein the precursor film has at least 30% by weight filler and is cumulatively stretched by said plurality of discrete stretching steps from 2 to 7 times its original length.

21. A method according to claim 20 wherein said stretched film has a basis weight of less than about 35 gsm and further wherein after the plurality of discrete stretching steps a support fabric, traveling at substantially the same speed as the stretched film, is superposed with and laminated to said stretched film.

22. A method according to claim 20 wherein the precursor film comprises a polyolefin based polymer and at least about 50% by weight particulate filler.

23. A method according to claim 2 wherein the speed of said stretched film at the last stretching step of said plurality of discrete stretching steps is in excess of 1000 feet per minute and wherein the average strain rate of the plurality of discrete stretching steps is less than about 70,000%/minute.

24. A method according to claim 23 wherein the strain rate of each of said discrete stretching steps is less than 70,000%/minute.

25. A method according to claim 23 wherein the strain rate of each of said discrete stretching steps is less than 50,000%/minute.

26. A method according to claim 24 wherein the precursor film is stretched at first and second discrete stretching steps.

27. A method according to claim 25 wherein the precursor film is stretched at first, second and third discrete stretching steps.

28. A method according to claim 24 wherein said stretched film has a basis weight less than about 35 gsm and further wherein after the plurality of discrete stretching steps a support fabric, traveling at substantially the same speed as the stretched film, is superposed with and laminated to said stretched film.

29. A method according to claim 28 wherein said support fabric is a nonwoven web.

30. A method according to claim 29 wherein said nonwoven web is laminated to said stretched film by the method selected from the group consisting of thermal point bonding, ultrasonic bonding and adhesive bonding.

31. A method according to claim 28 wherein the precursor film comprises a polyolefin based polymer and at least 50% calcium carbonate filler and wherein said support fabric comprise a polyolefin nonwoven web.

32. A method according to claim 28 wherein the precursor film has at least 30% by weight filler and is cumulatively stretched by the plurality of discrete stretching steps to within 50 to 90% of elongation at break.

33. A method according to claim 28 wherein said thermoplastic polymer comprises a polyolefin based polymer and said precursor film is cumulatively stretched by said discrete stretching steps from 2 to 7 times its original length and wherein the stretched film has a WVTR in excess of 1000 g/M$^2$/24 hours.

34. A method according to claim 33 wherein the precursor film comprises at least about 50% by weight particulate filler.

35. A method according to claim 2 wherein the speed of said stretched film at the last stretching step of said plurality of discrete stretching steps is in excess of 1250 feet per minute and wherein the average strain rate of the plurality of discrete stretching steps is less than about 70,000%/minute.

36. A method according to claim 35 wherein the strain rate of each of said plurality of discrete stretching steps is less than 70,000%/minute.

37. A method according to claim 35 wherein the strain rate of each of said plurality of discrete stretching steps is less than 50,000%/minute.

38. A method according to claim 36 wherein the precursor film is stretched at first and second discrete stretching steps.

39. A method claim 37 wherein the precursor film is stretched at first, second and third discrete stretching steps.

40. A method according to claim 36 wherein said stretched film has a basis weight less than about 35 gsm and further wherein after the plurality of discrete stretching steps a support fabric, traveling at substantially the same speed as the stretched film, is superposed with and laminated to said stretched film.

41. A method according to claim 40 wherein said support fabric is a nonwoven web.

42. A method according to claim 41 wherein said nonwoven web is laminated to said stretched film by a the method selected from the group consisting of thermal point bonding, ultrasonic bonding and adhesive bonding.

43. A method according to claim 40 wherein the precursor film comprises a polyolefin based polymer and at least 50% calcium carbonate filler and wherein said support fabric comprises a polyolefin nonwoven web.

44. A method according to claim 40 wherein the precursor film has at least 30% by weight filler and is cumulatively stretched by the plurality of discrete stretching steps to within 50 to 90% of elongation at break.

45. A method according to claim 40 wherein said precursor film is stretched from 2 to 7 times its original length and wherein the stretched film has a basis weight of less than 35 gsm.

46. A method according to claim 45 wherein the precursor film comprises a polyolefin based polymer and at least about 50% by weight particulate filler.

47. A method according to claim 2 wherein the speed of said stretched film at the last stretching step of said plurality of discrete stretching steps is in excess of 1500 feet per minute and wherein the average strain rate of the plurality of discrete stretching steps is less than about 70,000%/minute.

48. A method according to claim 47 wherein the precursor film is stretched at first and second discrete stretching steps.

49. A method according to claim 48 wherein the strain rate of each of said first and second discrete stretching steps is less than 50,000%/minute.

50. A method according to claim 48 wherein the precursor film is stretched at first, second and third discrete stretching steps.

51. A method according to claim 47 wherein after said plurality of discrete stretching steps a support fabric, traveling at substantially the same speed as the stretched film, is superposed with and laminated to said stretched film.

52. A method according to claim 51 wherein the precursor film comprises a polyolefin based polymer and at least about 50% by particulate filler and further wherein the precursor film is cumulatively stretched by the plurality of discrete stretching steps in excess of 2 times its original length and wherein the stretched film has a basis weight of less than 35 gsm and a WVTR in excess of 1000 g/$M^2$/24 hours.

53. A method of making a breathable barrier according to claim 2 wherein the average strain rate of the plurality of discrete stretching steps is less than 70,000%/minute and the line speed of the fabric at the last stretching step of said plurality of discrete stretching steps is in excess of 2000 feet per minute.

54. A method according to claim 53 wherein the strain rate of each of said plurality of discrete stretching steps is less than about 50,000%/minute.

55. A method according to claim 53 wherein said stretched film has a basis weight of less than about 35 gsm and further wherein after said plurality of discrete stretching steps a support fabric, traveling at substantially the same speed as the stretched film, is superposed with and laminated to said stretched film.

56. A method according to claim 53 wherein said precursor film comprises a polyolefin based polymer and at least about 50% particulate filler and further wherein said precursor film is cumulatively stretched by said plurality of discrete stretching steps in excess of 2 times its original length.

* * * * *